US008182784B2

(12) United States Patent
Paul et al.

(10) Patent No.: US 8,182,784 B2
(45) Date of Patent: May 22, 2012

(54) PROCESS FOR THE TIME RECOVERY OF SULPHATE OF POTASH (SOP) FROM SULPHATE RICH BITTERN

(75) Inventors: Parimal Paul, Gujarat (IN); Pushpito Kumar Ghosh, Gujarat (IN); Kaushik Jethalal Langalia, Gujarat (IN); Palani Sivagnana Subramanian, Gujarat (IN); Suresh Eringathodi, Gujarat (IN); Subrata Patra, Gujarat (IN); Pragati Agnihotri, Gujarat (IN)

(73) Assignee: Council of Scientific & Industrial Research, New Delhi (IN)

( * ) Notice: Subject to any disclaimer, the term of this patent is extended or adjusted under 35 U.S.C. 154(b) by 376 days.

(21) Appl. No.: 12/084,755

(22) PCT Filed: Dec. 27, 2005

(86) PCT No.: PCT/IN2005/000441
§ 371 (c)(1),
(2), (4) Date: Jun. 8, 2010

(87) PCT Pub. No.: WO2005/063626
PCT Pub. Date: Jul. 14, 2005

(65) Prior Publication Data
US 2010/0266482 A1 Oct. 21, 2010

(30) Foreign Application Priority Data
Nov. 10, 2005 (IN) .............. 3014/DEL/2005

(51) Int. Cl.
*C01D 5/00* (2006.01)

(52) U.S. Cl. .................... 423/551; 23/302 R
(58) Field of Classification Search ............. 423/551; 23/302 R
See application file for complete search history.

(56) References Cited

U.S. PATENT DOCUMENTS

| 3,528,767 A | 9/1970 | Garrett | 23/89 |
| 3,634,041 A | 1/1972 | Ryan | 23/297 |
| 7,041,268 B2 * | 5/2006 | Ghosh et al. | 423/552 |

FOREIGN PATENT DOCUMENTS

WO  WO 2005/063626 A1  7/2005

* cited by examiner

*Primary Examiner* — Timothy Vanoy
(74) *Attorney, Agent, or Firm* — Abelman, Frayne & Schwab

(57) ABSTRACT

The present invention relates to a process for the recovery of sulphate of potash (SOP) from bittern. Kainite is obtained by fractional crystallization of the bittern. Kainite is converted into schoenite with simultaneous removal of NaCl and the filtrate (SEL) is used for production of KCl. Schoenite is reacted with aqueous KCl to yield SOP and the filtrate (KEL) is recycled in the kainite to schoenite conversion step. The production of KCl from SEL is carried out with the aid of dipicrylamine (DPA). Lime is treated with DPA in water for the production of highly soluble Ca (DPA)2, which in turn treated with SEL to produce insoluble K(DPA). K(DPA) is treated with HCl to produce KCl and insoluble DPA, which can be recycled for the production of Ca (DPA)2. The aqueous KCl thus obtained is treated with schoenite to prepare SOP. The KEL obtained along with SOP is recycled to generate schoenite.

25 Claims, No Drawings

PROCESS FOR THE TIME RECOVERY OF SULPHATE OF POTASH (SOP) FROM SULPHATE RICH BITTERN

FIELD OF THE INVENTION

The present invention relates to a novel integrated process for the production of sulphate of potash (SOP) from sulphate-rich bittern. More specifically the process relates to recovery of KCl in concentrated solution form from liquid effluent generated during transformation of kainite into schoenite using dipicrylamine as recyclable extractant and use of the KCl solution as per the known prior art for preparation of sulphate of potash from schoenite. SOP is a dual fertilizer containing 50% $K_2O$ and 18% Sulphur. It has the lowest salt index and is virtually free of chloride, which makes it a superior fertilizer to muriate of potash (MOP). On the other hand, MOP is easy to produce especially when brine/bittern is low in sulphate content such as in the Dead Sea and this accounts for its lower price compared to SOP. Countries such as India, which do not have low sulphate bittern, but which have adequate bittern of sea and sub-soil origin, would be greatly benefited if SOP can be produced economically from such bittern sources. Besides its application as a fertilizer, potassium sulphate has numerous industrial applications as well.

BACKGROUND OF THE INVENTION

Reference may be made to the well-known Mannheim process involving reaction of MOP with sulphuric acid. The major problem with the process is that it is energy intensive and poses a problem of hydrochloric acid (HCl) management when no application of commensurate volume for HCl is available in the vicinity.

In a paper entitled "Production of potassium sulphate by an ammoniation process", *Chemical Engineer,* 349, pp 688-690, October 1979, by J. A. Fernandez Lozano and A. Wint, describes the process of SOP manufacture from MOP through reaction with gypsum in presence of ammonia. The principle of the process is the double decomposition reaction between gypsum and potassium chloride in presence of ammonia at 0° C. The main disadvantage of the process is that it is energy intensive and necessitates careful design of the reactor for safe operation. In a paper entitled "Messo pilots new potassium sulphate process', *Phosphorous & Potassium,* 178, March-April 1992, p-20, by H. Scherzberg et al. describe the successful trials on a process involving reaction of MOP with sodium sulphate to produce the double salt glaserite ($3K_2SO_4.Na_2SO_4$). The glaserite is in turn reacted with MOP to produce SOP. The main disadvantage of the process is that it would be unsuitable for those who do not have access to such raw materials. Moreover, the process involves several complex unit operations including the need for chilling. Such processes have their limitation on large scale.

In a paper entitled 'Duisberg's alternative to Mannheim', *Phosphorous & Potassium,* 178, March-April 1992, p-20, by H. Scherzberg and R. Schmitz describe an integrated process for production of SOP from KCl and $MgSO_4$ or $Na_2SO_4$. The main drawback of the process is that the amount of NaCl in raw materials has a critical effect on the process and, as such, would be less applicable to crude mixed salt as obtained from sea bittern. Another disadvantage is that the process involves heating and cooling which makes it energy intensive. Yet another disadvantage is that the by-product obtained is $MgCl_2$ in concentrated solution form which has a limited market and lower appeal compared to low $B_2O_3$ containing $Mg(OH)_2$ solid produced as part of the integrated process of the present invention. In a paper entitled 'Mixed Salt from Sea Bittern', *Salt Research & Industry,* 2, 126-128, 1969 by G. D. Bhatt et al. have described the process of manufacture of mixed salt, i.e., comprising a mixture of NaCl and kainite ($KCl.MgSO4.3H_2O$), from sea bittern through solar evaporation and fractional crystallisation.

In a paper entitled "Preparation of syngenite from mixed salt in pure form in *Salt Research & Industry*, Vol. 6, No. 14, 1969 by K. P. Patel. and the paper entitled "Potassium Sulphate from Syngenite" by K. P. Patel, R. P. Vyas and K. Seshadri, in *Salt Research & Industry,* Vol. 6, No. 2, April 1969, wherein a process for preparation of SOP by leaching syngenite ($K_2SO_4.CaSO_4.H_2O$) with hot water and then recovering it by solar evaporation is described. The main drawback of the process is that it is energy intensive. Moreover, production of syngenite from mixed salt is itself an involved affair.

In a paper entitled *"Manufacture of Potassium chloride and byproducts from Sea Bittern"* by K. Seshadri et al. in *Salt Research and Industry*, April-July 1970, Vol 7, page 39-44, wherein mixed salt (NaCl and kainite) obtained from bittern is dispersed with high density bittern in proper proportion and heated to a temperature of 110° C. when kieserite ($MgSO_4.H_2O$) is formed which is separated by filtering the slurry under hot conditions. The filtrate is cooled to ambient temperature, when carnallite crystallizes out. Carnallite is decomposed with water to get a solid mixture of sodium chloride and potassium chloride while magnesium chloride goes into solution. Solid mixture of potassium chloride and sodium chloride is purified using known techniques to produce pure potassium chloride. The drawbacks of this process are that it fails to make use of the sulphate content in bittern and, instead, offers an elaborate process for manufacture of MOP, which, in any case, is inferior to SOP as fertilizer.

US Patent Application Number 2003 0080066 dated Oct. 29, 2001 by Vohra, Rajinder N. et. al. wherein an integrated process is revealed for recovery of high purity salt, potassium chloride, and end bittern containing 7.5 gpl Bromine. The process is based on desulphatation of brine with distiller waste of soda ash industry or calcium chloride generated from limestone and acid. The main drawback of the patent application is that the process is less attractive when distiller waste is not available in the vicinity and the process becomes less economical when carnallite has to be obtained from bittern without production of industrial grade salt. Moreover, as in the case referred to above, it is desirable to utilize the sulphate content in bittern and produce SOP in preference to MOP.

In a paper entitled 'Great Salt Lake—A fertile harvest for IMC' in *Phosphorus & Potassium,* 225, Jan-Feb, 2000. by Michael Freeman, have described the process which comprises of concentrating the brine containing 0.2-0.4% KCl, harvesting mixed salt, separation of high sodium chloride fraction through floatation, leaching with sulphate rich brine to produce schoenite, hot water dissolution of schoenite, fractional crystallization of SOP and recycling of mother liquor containing up to 30% of original K to evaporation pond. The main drawbacks of the process are: (i) the need for floatation which involves use of organic chemicals whose disposal is problematic, (ii) need for external heat for the purpose of recovery of SOP from schoenite through fractional crystallization at elevated temperature, (iii) need for recycling of as much as 30% of K to evaporation ponds where again it gets contaminated with other components of the brine.

In Ullmann's Encyclopedia of Industrial Chemistry, Sixth Edition, 1999, under the Chapter, Potassium compounds, a description of a process for production of SOP in Sicily is detailed. Kainite ($KCl \cdot MgSO_4 \cdot 2.75 H_2O$), is obtained from a potash ore by flotation. It is then converted into schoenite at ca. 25° C. by stirring with mother liquor containing the sulfates of potassium and magnesium from the later stages of the process. Schoenite is filtered off and decomposed with water at ca. 48° C. This causes magnesium sulfate and part of the potassium sulfate to dissolve and most of the potassium sulfate to crystallize. The crystals are filtered and dried. The sulfate mother liquor is recycled to the kainite—schoenite conversion stage. The main drawbacks of the process are that there is no mention of the fate of the mother liquor obtained upon conversion of kainite into schoenite which would inevitably entail considerable loss of K, and the need for external source of heat to effect the fractional crystallization of SOP.

Chinese patent CN 2000-112497, 29 Aug. 2000, by Song, Wenyi; et al., entitled "Method for preparing $K_2SO_4$ from sulphate type K-containing bittern." The method comprises concentrating the bittern, separating NaCl, concentrating to obtain crude K-Mg salt containing 10-45% NaCl, crushing, mixing with saturated bittern to obtain a solution with concentration of 20-40%, removing NaCl by back-floatation, concentrating, dewatering to obtain refined K—Mg salt containing less than 5% NaCl, mixing the K—Mg salt and water at specified ratio, allowing the mixture to react at 10-60° F. for 0.5-3 hr, separating to obtain schoenite, mixing with KCl and water at specified ratio, allowing the mixture to react at 10-70° F. for 0.25-3 hr and separating to obtain $K_2SO_4$. The drawbacks of the process are (i) need for elaborate method of purification of mixed salt that includes removing NaCl by the less desirable method of back floatation that involves use of organic chemicals, (ii) lack of any mention of the manner in which the various effluent streams are dealt with, and (iii) dependence on outsourced KCl since no mention is made of any process for KCl production as part of the process.

In a paper entitled "Extraction of Potash and other Constituents from sea water Bittern" in Industrial and Engineering Chemistry, Vol. 10, No. 2, 1918, pp 96-106, by J. H. Hildebrand wherein theoretical aspects of the recovery of potash from sea bittern are described and a process for extraction is proposed. According to this process, bittern is evaporated at a temperature between 100-120° C., thereby forming a solid mixture of sodium chloride and kieserite ($MgSO_4 \cdot H_2O$), separating this mixture under hot conditions in a heated centrifuge, and cooling the mother liquor in a cooler for separation of carnallite. Carnallite is decomposed and washed with water to produce potassium chloride. The drawback of this process is that it is demanding in terms of energy requirement and sufficiently pure carnallite cannot be obtained. The main drawback of the process is the contamination of kieserite with NaCl which would necessitate further purification to obtain products in saleable form. Another drawback of the process is that it requires energy to remove sulphate from bittern in the form of kieserite whereas it would be preferable to utilize the sulphate for the production of SOP.

In yet another paper entitled "Production of Potassium Sulphate from Mixed Salt" in Salt Research & Industry, Vol. 2, No. 4, October 1965, by D. J. Mehta et al. describes a process of floatation technique for the production of potassium sulphate from two types of mixed salt available from the salt works of the Little Rann of Kutch is described. The process suffers from the drawback of lack of suitability when high sulphate containing sea bittern is used and the need for froth floatation, which is costly, cumbersome and polluting.

In Ullmann's Encyclopedia of Industrial Chemistry, Sixth Edition, 2002 (Electronic Version) dealing with Magnesium Compounds written by Margarete Seeger, Walter Otto, Wilhelm Flich, Friedrich Bickelhaupt and Otto. S. Akkerman, wherein the process of preparation of magnesium hydroxide from seawater is described. It is mentioned therein that preparation of low boron containing magnesia requires over liming of the seawater up to pH 12 to maintain $B_2O_3$ content less than 0.05% in magnesia. Over liming involves higher lime cost, need for neutralization of supernatant and results in a colloidal suspension which is not easy to filter. Another drawback is a lack of application of calcium chloride-containing effluent, which is discharged back into the sea.

Reference may be made to the Canadian patent entitled, "Process for the manufacture of potassium sulphate by treatment of solution containing magnesium chloride and potassium chloride", application No. 423211, CA 1203666, by Wendling et al. wherein a process for the production of potassium sulphate from solutions containing magnesium chloride, such as solutions of carnallite ore and, in particular, the equilibrium mother liquors of a unit for the treatment of carnallite is described. According to this process, sodium sulphate and potassium chloride are added to the solutions containing magnesium chloride, so as to precipitate sodium chloride and schoenite, $K_2SO_4 MgSO_4 6H_2O$, and the schoenite obtained is treated in a known manner to produce potassium sulphate. The main drawback of the process is the need to outsource sodium sulphate and the lack of any mention of a solution to the problem of KCl loss in effluent streams.

In a paper entitled "Recovery of Potassium Salts from Bittern by Potassium Pentaborate Crystallisation' in Separation Science & Technology, 31(6), 1996, pp. 857-870, by H. Gurbuz et al wherein sodium pentaborate is prepared from the reaction of Tincal and recycled $H_3BO_3$ in presence of water and thereafter treated with bittern to selectively precipitate out potassium pentaborate, which in turn is acidulated with sulphuric acid and fractionally crystallized to remove $K_2SO_4$ and recycle the $H_3BO_3$ in the process. The main drawbacks of the process are that the mother liquor contains significant quantities of boron which entails elaborate procedure to recover boron and, moreover, the MgO obtained from such mother liquor would be unfit for industrial use. Moreover, although such a process can still be thought of for sulphate poor bittern, it would not be a preferred route when the bittern is rich in sulphate content. Yet another drawback is the need to chill the acidulated product for high yield.

In a paper entitled "Henry's constant for Bromine-Sea Brine systems and liquid film mass transfer coefficient for desorption of bromine from sea brine" by A. S. Mehta in Indian Chemical Engineer, 45(2), 2003, p. 73, wherein the author describes the process of bromine manufacture from bittern. Bittern is acidified with sulphuric acid to a pH of 3.0-3.5 and the bromide ion is then oxidized with chlorine and stripped off with the help of steam. The acidic de-brominated bittern is neutralized with lime, the sludge thus formed removed, and the effluent discharged. Reference may also be made to bromine plants located in the vicinity of natural salt beds in the Greater Rann of Kutch in Gujarat, India that utilize natural bittern for bromine production by the above method and discharge their effluent back into the Rann. Disposal of sludge poses a formidable challenge in these plants.

In a paper entitled "*Improved Treatment of Waste Brines*" by Chr. Balarew, D. Rabadjieva and S. Tepavitcharova, (*International Symposium on Salt* 2000, page 551-554) for recovery of marine chemicals. The authors describe the use of lime for precipitation of $Mg(OH)_2$ from a part of available bittern, and desulphatation of balance bittern with the resultant $CaCl_2$ solution for recovery of KCl via carnallite. The authors have not discussed any scheme of utilizing such methodology for production of SOP from sulphate-rich bittern. Moreover, as will be evident later, $Mg(OH)_2$ produced directly from raw bittern has much higher $B_2O_3$ content compared to $Mg(OH)_2$ prepared from the $Mg^{2+}$ source of the present invention, which is linked to production of SOP.

Chinese Patent No. 1084492 assigned to Lu Zheng describes the process of manufacture of SOP from bittern and potassium chloride. In this process, bittern is processed by evaporation, cooling, floatation and then it is reacted with potassium chloride to make potassium sulfate and by-products of industrial salt and residual brine. The main drawbacks of this process are that it requires involved separation techniques like floatation to remove NaCl from mixed salt and KCl required for production of SOP from schoenite has to be procured separately. Moreover, although overall yield in terms of potash recovery is 95%, yield with respect to such procured KCl is not mentioned.

In a WO patent application No: PCT/IN03/00463, 2003 by P. K. Ghosh et al describes the process of manufacture of SOP from bittern and MOP. In this process, kainite-type mixed salt was produced by evaporation of sea bittern and the mixed salt was then treated with water (and also $K^+$-rich liquor obtained during schoenite into SOP) to obtain schoenite and a by-product liquor (SEL) containing sodium, potassium and magnesium salts. This liquor is then treated with $CaCl_2$ to eliminate sulphate and then evaporated to produce carnallite which is then decomposed and hot leached to obtain KCl in solid form. The schoenite is then treated with KCl and water to obtain SOP and a filtrate that can be recycled in the step involving conversion of kainite mixed salt into schoenite. The drawback of this process is that the production of KCl from SEL through carnallite intermediate is lengthy, involves co-generation of $Mg(OH)_2$, and requires evaporation of large amounts of water. Thus while it is useful to generate KCl from waste, an improved process would be highly desirable.

In a paper entitled "Study of the Competitive Binding of Mixed Alkali and Alkali Earth Metal Ions using Dibenzo-30-Crown-10" (*Polyhedron* 2005, 24, pp. 1023-1032) by P. Agnihotri et al. wherein potassium rich bitterns were treated with the crown ligand to extract out potassium selectively. Reference is also made to other references contained in the paper. The drawbacks of the process are the relatively low selectivity of these ligands and difficulties around regeneration of the ligand.

In a paper entitled "The quantitative determination of potassium with hexanitro diphenylamine (dipicryal amine)" in *Angewandte Chemie*, 49(46), pp 827-30, 1936 by A. Winkel et al. In this method Mg-dipicryalaminate, which is highly soluble in water, is used to prepare insoluble K-dipicryalaminate. The main draw back of this process is that the inventors have not revealed the recovery of $K^+$ and recycling of dipicryalamine (DPA) from K-dipicryalaminate.

Australian patent AU 109552, 1940 "Potassium salts", assigned to J. Kielland, describes the recovery of potassium from brine with the aid of dipicrylamine. $Ca^{2+}$ salt of dipicrylamine was added to brine, the precipitated K-dipicrylaminate is separated and treated with mineral acids, which liberated dipicrylamine for further use. The drawbacks of this process are that no distinct advantage in undertaking such extraction is disclosed.

German patent DE 726545, 1942 "Extracting potassium from dilute solutions, e. g., sea water", assigned to E. Berner, and J. Kielland, describes the use of highly nitrated, secondary aromatic amines, e. g, hexanitromethyldiphenylamine or pentanitromethyldiphenyl-amine for the extraction of potassium. The drawbacks of this process are that isolation of solid salt from the dilute aqueous solution is energy intensive and no definite advantage was undertaken for direct use of the aqueous solution.

Great Britain patent No GB 605694, 1948 "Recovery of potassium salts" describes the process of recovery of $K^+$ salt from sea water using dipicrylamine. Sea water was treated with a solution of Ca-dipicrylaminate, whereby insoluble K-dipicrylaminate was filtered and treated with a mineral acid such that the $K^+$ goes into solution while dipicrylamine remains as solid, which was recycled. The main drawback of this process is that there is no report to use this methodology for the preparation of KCl solution for the explicit purpose of utilizing it for SOP production.

In a paper entitled "Extraction of potassium salts from saline mother liquors by hexanitrodiphenylamine. II", *Ann. Chim.* (*Rome*), 51, pp 645-55, 1961. by F. Massazza, and B. Riva, the extraction of potassium salts from saline mother liquors by hexanitrodiphenylamine is described. The precipitated K-dipicrylaminate was treated with $HNO_3$, which formed $KNO_3$ and regenerated dipicryalamine. The main drawback of this process is that it has been exclusively used for the preparation of potassium nitrate and no report to use of this methodology for preparation of aqueous KCl to use it for SOP production.

In a paper entitled "Selective extraction of potassium from sea water, bitterns, and mixed salts", *Technology* (Sindri, India), 3(4), 177-83, 1966, by J. N. Kapoor, and J. M. Sarkar, the extraction of $K^+$ from sea water, bitterns, and mixed salts using Mg-dipicrylamine is described. Mg-dipicrylaminate produces precipitate of K-dipicrylaminate, the chelating agent is then regenerated with $HNO_3$, also forming $KNO_3$. The main drawback of this process is that no report to use of this methodology for preparation of aqueous KCl for its direct application for the production of SOP.

In a paper entitled "Recovery of potassium from sea water and salt bittern with dipicrylamine", *Huaxue*, 4, pp 106-11, 1969 by S.-K. Chu, and C.-T. Liaw, the recovery of $K^+$ as chelate compound of dipicrylamine from artificial sea water, natural sea water, and salt bittern as described. Recovery of dipicrylamine was best achieved by adjusting pH of the solution below 3. The main drawbacks of this process are that no report for utilization or isolation of the $K^+$ salt and recycling of DPA.

In a paper entitled "Potassium from sea water—a daring venture", *Chemistry and Industry*, 13th November issue, pp 1309-1313, 1971. by J. Kielland has described the process of recovery of $K^+$ as K-dipicrylaminate by adding Ca-dipicrylaminate into sea water. The precipitated K-dipicrylaminate is treated with $HNO_3$ to form a $KNO_3$ solution and insoluble dipicrylamine is recycled. The main drawbacks of this process are that $KNO_3$ has no use for production of SOP and there is no report for generation of aqueous KCl following the same methodology.

In a paper entitled "Recovery of potassium from concentrated sea water with dipicrylamine", in *Nippon Kaisui Gakkaishi*, 32(2), pp 82-8, 1978. by M. Matsuda et al. the recovery of $K^+$ from concentrated brine as described. $Na^+$ salt of dipicrylamine anion was added into concentrated brine to precipitate $K^+$ salt of dipicrylamine, which was then reacted with $HNO_3$ to form $KNO_3$ and dipicryalamine was precipitated. The main drawbacks of this process are that $KNO_3$ has no use for production of SOP and there is no report for generation of aqueous KCl following the same methodology.

In a paper entitled "Recovery of potassium using magnesium dipicrylaminate" in *Chemical Era*, 14(8), pp 290-6, 1978. by M. Y. Bakr et al. the process of recovery of $K^+$ as K-dipicrylaminate by adding Mg-dipicrylaminate into bitterns as described. The precipitated K-dipicrylaminate is treated with $HNO_3$ to form a $KNO_3$ solution and insoluble dipicrylamine. The main drawback of this process is that the focus has been exclusively on preparation of potassium nitrate by the above technique and no report to use of this methodology for preparation of KCl solution for the purpose of utilizing it for SOP production.

In a review article entitled "Recovery of potassium using magnesium dipicrylaminate", *Chemical Economy & Engineering Review*, 11(1-2), pp 31-5, 1979. by M. Y. Bakr et al. set described the reaction conditions for recovery of $KNO_3$ from K-dipicrylaminate. K-dipicrylaminate obtained from extraction of $K^+$ from Egyptian bitterns is decomposed by $HNO_3$ solutions at different conditions to determine the best conditions for recovery of $KNO_3$ and dipicrylamine for recycle. The main drawbacks of this process are that $KNO_3$ has no use for the preparation of SOP and there is no report to exploit this methodology for generation of aqueous KCl, which can be used for SOP production.

In a paper entitled "Towards Understanding of the Selective Precipitation of Alkali Metal Cations in Presence of Dipicrylamine Anion" (*Eur. J. Inorg. Chem.*, 2005, pp. 2198-2205), by E. Suresh et al. describes the causes underlining the selectivity of dipicrylamine towards different ions have been unraveled and, in particular, the high selectivity towards $K^+$ in bittern systems has been explained.

OBJECTS OF THE INVENTION

The main object of the invention is to provide a novel integrated process for the production of sulphate of potash (SOP) from sulphate-rich bittern generated during production of schoenite from kainite mixed salt.

Another object of the present invention is to utilize such KCl obtained in the form of concentrated solution directly for the preparation of sulphate of potash (SOP) through the reaction with schoenite.

Still another object of the present invention is to dispense with the requirement of water in the reaction between KCl and schoenite to form SOP, such water being already present in the concentrated KCl solution.

Yet another object of the present invention is to utilize dipicrylamine (DPA) as recyclable ligand to extract out $K^+$ selectively from SEL without recourse to any evaporation.

Yet another object of the present invention is to treat DPA with slight excess of inexpensive lime slurry to convert it completely into water soluble $Ca(DPA)_2$ which reacts with the $K^+$ in SEL to form K(DPA) while releasing $Ca^{2+}$ that can react with the $SO_4^{2-}$ in SEL to precipitate out gypsum ($CaSO_4$) simultaneously.

Yet another object of the present invention is to treat the crude mixture of K(DPA) and gypsum with HCl to leach out 90-95% of the $K^+$ in the form of a concentrated KCl solution leaving a residue of gypsum, DPA and small quantities of unreacted K(DPA).

Yet another object of the present invention is to obtain KCl in concentrated solution form that can be used directly in the SOP forming reaction.

Yet another object of the present invention is to obtain KCl solution of required purity (>90%).

Yet another object of the present invention is to treat the small quantities of unreacted K(DPA) remaining along with gypsum and DPA with aqueous $HNO_3$ to decompose the complex completely so as to eliminate DPA losses in gypsum, recover maximum amount of $K^+$, and to purify the gypsum.

Yet another object of the present invention is to treat the residue of gypsum and DPA with slight excess of lime slurry to solubilise the DPA completely in the form of $Ca(DPA)_2$ leaving behind pure gypsum.

Yet another object of the present invention is to devise a cyclic process with complete utilization of all aqueous washings and which yields concentrated solutions of KCl and $KNO_3$.

Yet another object of the present invention is to devise a process that can operate under ambient conditions.

Yet another object of the present invention is to have a process for faster recovery of KCl from SEL through the steps of precipitation and decomposition of K(DPA).

Yet another object of the present invention is to produce SOP economically on standalone basis with gypsum and small quantity of $KNO_3$ as by-products.

SUMMARY OF THE INVENTION

Accordingly, the present invention provides a novel integrated process for the production of sulphate of potash (SOP) from sulphate-rich bittern from kainite type mixed salt, the said process comprising the steps of:

(i) treating the mixed salt with an appropriate quantity of water in the first batch to leach out NaCl, under ambient conditions, and simultaneously converting kainite into schoenite, (ii) filtering the resultant schoenite and separately collecting the filtrate referred to as SEL, (iii) treating the above said SEL with stoichiometric (w.r.t. [$K^+$] in SEL) quantity of $Ca(DPA)_2$ (DPA=dipicryalamine) to obtain K(DPA), obtained by treating DPA with 1-5% stoichiometric excess (w.r.t. DPA) of lime slurry;

(iv) filtering the above said resultant K(DPA) and $CaSO_4$ and discarding the filtrate, (v) treating the resultant residue with 2-3 fold excess of aqueous HCl solution having 5-6 N concentration to decompose most of the K(DPA), (vi) filtering the resultant solution of KCl and excess acid from $CaSO_4$ and unreacted K(DPA);

(vii) washing the resultant residue with a small quantity of water and mixing the washing with the initial filtrate of KCl;

(viii) treating the remaining residue obtained in step (vii) with 10-20 fold excess of 4-6 N $HNO_3$ to decompose traces of K(DPA) and filtering the mass and keeping aside the filtrate containing $KNO_3$ and $HNO_3$, (ix) treating the above said resultant residue containing DPA and $CaSO_4$ with 1-5% stoichiometric excess (w.r.t. DPA) of lime slurry and filtering the solution to obtain gypsum residue and filtrate containing $Ca(DPA)_2$ for recycling in step (iii), (x) repeating step (iii) with the $Ca(DPA)_2$ generated in step (ix) and repeating the filtration process of step (iv), (xi) re-using the aqueous solution containing KCl and HCl generated in steps (vi) and (vii) for the decomposition of the residue obtained from step (x) as per the procedure of step (v), so as to consume residual acid and simultaneously building up KCl concentration;

(xii) re-using the aqueous solution containing $KNO_3$ and $HNO_3$ generated in step (viii) for the complete decomposition reaction of the remaining residue of step (xi) as per the procedure of step (viii), so as to consume residual acid and simultaneously building up $KNO_3$ concentration, (xiii) building up the KCl and $KNO_3$ concentrations in the solutions towards saturation limits by taking the solutions of salt and acid through several cycles as described in steps (xi) and (xii), respectively, (xiv) treating the near-saturated KCl solution obtained in step (xiii) with a small quantity (1-5% by weight of KCl) of schoenite to precipitate out traces of $Ca^{2+}$ impurity in the solution in the form of gypsum by utilizing the sulphate in schoenite, (xv) treating the above said KCl solution of step (xiv) with stoichiometric amount of schoenite generated in step (ii) to obtain SOP, (xvi) filtering the above said solution of step (xv) to obtain the desired SOP having >92% purity and the mother liquor (KEL), (xvii) recycling the mother liquor (KEL) obtained in step (xvi) in step (i) for subsequent batches of reactions.

In an embodiment of the present invention the kainite type mixed salt used contains KCl—15-22%; NaCl—15-22%; $MgSO_4$—28-40%; $MgCl_2$—5-10%.

In another embodiment of the present invention in step (i) kainite is converted into schoenite by a process as described and disclosed in our co-pending PCT patent application no. PCT/IN03/00463, In yet another embodiment in step (i) one part by weight of mixed salt is treated with 0.3-0.7 parts by volume of water in first batch of reaction.

In yet another embodiment in step (i) one part by weight of mixed salt is treated with 0.75-1.25 parts by volume of KEL obtained in step (xvi) in the subsequent batches of reactions.

In yet another embodiment the composition of KEL obtained in step (xvi) is typically 11-14% KCl, 1-3% NaCl, 9-11% $MgSO_4$, and 1-2% $MgCl_2$.

In yet another embodiment the composition of SEL obtained in step (ii) is typically 6-12% KCl, 5-15% NaCl, 10-20% $MgSO_4$ and 4-10% $MgCl_2$.

In yet another embodiment the composition of the schoenite obtained in step (ii) is 40-45% $K_2SO_4$, 30-35% $MgSO_4$ and 0.5-2.0% NaCl.

In yet another embodiment all processing was carried out under ambient conditions, preferably at a temperature in the range of 15-40° C.

In yet another embodiment the $Ca(DPA)_2$ used is prepared by treating DPA with 1-5% stoichiometric excess of lime slurry.

In yet another embodiment the mole ratio of DPA to lime for the preparation of $Ca(DPA)_2$ used is 1:0.5 to 1:0.6.

In yet another embodiment in step (iii) 1 mole of $Ca(DPA)_2$ used is treated with SEL containing 2.0-2.5 mol of KCl, preferably 0.21-0.23 mol of KCl.

In yet another embodiment the molar yield of K(DPA) obtained is 95-99% with respect to $Ca(DPA)_2$.

In yet another embodiment the strength of HCl used for decomposition of K(DPA) is 5-6N.

In yet another embodiment the KCl solution obtained has a concentration of 12-25%, preferably 18-22%.

In yet another embodiment the treatment of the aqueous KCl with schoenite improved the purity of KCl from 85-90% to 92-96%.

In yet another embodiment the molar yield of KCl obtained is in the range of 83-90% with respect to K(DPA).

In yet another embodiment the strength of aqueous $HNO_3$ used for the decomposition of residual K(DPA) is 4-6N.

In yet another embodiment the loss of DPA obtained per cycle is less than 1%.

In yet another embodiment one part by weight of schoenite used is treated with 0.3-0.5 parts by weight of KCl in the form of a concentrated solution.

In yet another embodiment the SOP obtained has $K_2O$ content in the range of 45-50%.

In yet another embodiment the molar yield of SOP obtained is in the range of 55-65% with respect to total $K_2O$ in schoenite and KCl and the balance is recycled for the decomposition of kainite mixed salt.

In yet another embodiment the molar yield of SOP obtained is in the range of 89-92% with respect to the $K_2O$ content in kainite mixed salt.

The following examples are given as way of illustration and should not be construed to limit the scope of present invention.

EXAMPLE 1

This example summarizes the novel SOP production process from kainite type mixed salt was produced from sea bittern and the end bittern was kept aside. The mixed salt was treated with appropriate quantity of water, and KEL obtained in the process below, and the slurry was filtered to yield schoenite and a filtrate (SEL) rich in KCl but which also contained other constituents, namely NaCl, $MgSO_4$, and $MgCl_2$. The schoenite was treated with solution of MOP in water under agitation. The slurry was filtered to obtain SOP and a filtrate (KEL) rich in KCl which is recycled for schoenite production. End bittern obtained during mixed salt production was desulphated and treated with lime and the slurry filtered to obtain $Mg(OH)_2$ and $CaCl_2$-containing filtrate which was used to desulphate SEL. Desulphated SEL was mixed with desulphated end bittern and evaporated to obtain carnallite. The carnallite was decomposed to obtain carnallite decomposed product which was then subjected to hot leaching to obtain KCl solid. The schoenite was then treated with the KCl and water to obtain SOP as described above.

This example teaches us that although recovery of solid KCl and magnesium hydroxide from SEL is feasible and eliminates the need for outsourced KCl, recovery of such KCl is a tedious process and is economical only when the intention is to recover $Mg(OH)_2$ simultaneously. Since there can be a mismatch in demand for SOP and $Mg(OH)_2$, an alternative process of recovery of KCl from SEL is desirable that eliminates the need to produce $Mg(OH)_2$ simultaneously. Another important drawback is the requirement of heating and also evaporation of large amounts of water. The example further teaches us that water needs to be added into the mixture of schoenite and KCl to produce SOP and that there is an opportunity to devise a process wherein the KCl is obtained in solution form with accompanying benefits of easier processing and elimination of additional requirement of water.

EXAMPLE 2

KCl is recovered from SEL by the alternative route of the present Example that overcomes the drawbacks referred to in Example 1. 100 g of DPA (0.228 mol) was reacted under ambient conditions with lime slurry containing 6.4 g (0.114 mol) of lime and 400 mL of water. The reddish brown solution of $Ca(DPA)_2$ thus obtained was added under stirring into 200 mL of SEL containing 13.2% NaCl, (0.226 mol %), 8.85% KCl (0.119 mol %), 5.6% of $MgCl_2$ (0.059 mol %) and 14.5% of $MgSO_4$ (0.121 mol %) over a period of 5 minute. Stirring was continued for 10 minutes. The precipitate of K(DPA) and $CaSO_4$ formed was filtered and washed with water (3×20 mL). It was treated with 80 mL of 5 N HCl under mechanical stirring for 2 hrs and the resultant solution of KCl. was filtered and washed with water (3×25 mL). The residue containing DPA and $CaSO_4$, was again treated with lime to regenerate $Ca(DPA)_2$ while stoichiometric amount of concentrated HCl was added into the washings for demetallation of K(DPA) in the second cycle. After five cycles, 600 mL of KCl solution was obtained whose pH was adjusted to 7.0. This solution analyzed as KCl: 12.5% (0.168 mol %), NaCl: 0.17% (0.003 mol %), $Ca^{2+}$: 0.18% (0.005 mol %), $Mg^{2+}$: 0.005% (0.0002 mol %). The solution was then added into 200 g of schoenite and stirred for 4.5 h. 60 g of SOP (33% yield w.r.t. total $K_2O$) was obtained having the following analysis: NaCl: 0.24% (0.004 mol %); $K_2SO_4$: 90.1% (0.518 mol %); $CaSO_4$: 7.96% (0.058 mol %).

Example 1 teaches us that although recovery of KCl with respect to $K_2O$ in SEL was 83.6%, the main drawbacks are: (i) 15% loss of DPA after 5 cycles, (ii) KCl solution recovered by DPA extraction method is too dilute which causes low yield (33%) of SOP, and (iii) there is as much as 8% gypsum impurity in the SOP.

EXAMPLE 3

The experiment of Example 2 was carried out again with 88 g of DPA and 170 mL of SEL having the following composition: NaCl: 12.5% (0.214 mol %), KCl: 8.7% (0.116 mol %), $MgCl_2$: 4.5% (0.047 mol %) and $MgSO_4$: 18.7% (0.155 mol)%. However, the KCl solution obtained had a concentration of 16%, which was made possible by taking twofold excess volume of 5N HCl which facilitated washing with reduced amount of water and thereby to minimize the overall volume. After three cycles, 250 ml of solution containing 40 g of KCl (0.537 mol) was obtained, with 86.3% recovery with respect to $K_2O$ in SEL. This KCl solution was treated with 112 g of schoenite and stirred for 4.5 h. The precipitated SOP was isolated and dried to yield 60 g (57.9% yield w.r.t. total $K_2O$) of SOP. However, the purity of SOP was still low at 90.1% and overall 15% loss of DPA was observed.

The present example teaches us a means of increasing the KCl concentration in solution to enhance SOP yield.

EXAMPLE 4

The experiment of Example 3 was repeated and KCl solution having 18.4% concentration was obtained from SEL. The former was treated with a small quantity of schoenite to remove $Ca^{2+}$ impurity in the solution in the form of $CaSO_4$. SOP prepared as described above using this KCl solution had purity of 92.5% with considerably reduced gypsum contamination (2.3%).

Examples 2 and 4 teach us that calcium contamination of KCl solution obtained from SEL can lower purity of SOP and that such $Ca^{2+}$ ions can be removed by treating the solution with a small quantitative of schoenite, filtering the solution and then finally treating with the required quantity of schoenite to produce SOP.

EXAMPLE 5

The experiment of Example 4 was repeated with one modification, namely, the decomposition of K(DPA) with excess HCl was followed by further treatment of the residue with excess $HNO_3$ solution. The acid solutions containing potassium salt from the decomposition of K(DPA) were recycled in subsequent batches. The loss of DP after five cycles was found to be 5%.

This Example teaches us that $HNO_3$ can effect more complete decomposition of K(DPA) and DPA loss is cut down from 15% to 5% after five cycles, and the latter loss mainly is due to handling losses. The $KNO_3$ solution can be made close to the saturation limit of this salt which can be then used for efficient recovery of solid $KNO_3$ or the solution can be used directly for appropriate applications.

EXAMPLE 6

This Example shows us the optimum working of the invention. 60 ml of SEL (containing 10.1% KCl) was treated with stoichiometric (w.r.t. $K_2O$) quantity of $Ca(DPA)_2$ prepared from 35 g of DPA and the resultant precipitate of K(DPA) was treated successively with aqueous HCl and $HNO_3$ solutions. The KCl solution obtained was treated with 0.6 g of schoenite and filtered to remove $CaSO_4$. The filtered solution containing 17.8% KCl was added to 13.1 g of schoenite and stirred for 4.5 h. The precipitated SOP was isolated by filtration and dried to yield 7.4 g (59.2% w.r.t. total $K_2O$) of SOP with 93.5% purity, the impurities being NaCl (1.4%), $CaSO_4$ (0.5%) and $MgSO_4$ (3.3%). The 34 ml of KEL containing 12.0% KCl, 12.5% $MgSO_4$ and only 0.7% NaCl is recycled in the step of mixed salt to schoenite conversion. DPA recovery was 99% and it is recycled in the subsequent batches.

We claim:
1. An integrated process for the production of sulphate of potash (SOP) from sulphate-rich bittern from kainite type mixed salt, said process comprising the steps of:
 (i) treating the mixed salt with an appropriate quantity of water in the first batch to leach out NaCl, under ambient conditions and simultaneously converting kainite into schoenite,
 (ii) filtering the resultant schoenite and separately collecting the filtrate referred to as SEL,
 (iii) treating the above said SEL with stoichiometric (w.r.t. [$K^+$] in SEL) quantity of $Ca(DPA)_2$ (DPA=dipicrylamine) to obtain K(DPA), obtained by treating DPA with 1-5% stoichiometric excess (w.r.t. DPA) of lime slurry,
 (iv) filtering the above said resultant K(DPA) and $CaSO_4$ and discarding the filtrate,
 (v) treating the resultant residue with 2-3 fold excess of aqueous HCl solution having 5-6 N concentration to decompose most of the K(DPA), filtering the resultant solution of KCl and excess acid from $CaSO_4$ and unreacted K(DPA),
 (vi) filtering the resultant solution of KCl and excess acid from CaSO4 and unreacted K(DPA),
 (vii) washing the resultant residue with a small quantity of water and mixing the washing with the initial filtrate of KCl,
 (viii) treating the remaining residue obtained in step (vii) with 10-20 fold excess of 4-6 N $HNO_3$ to decompose traces of K(DPA) and filtering the mass and keeping aside the filtrate containing $KNO_3$ and $HNO_3$,
 (ix) treating the above said resultant residue containing DPA and CaSO with 1-5% stoichiometric excess (w.r.t. DPA) of lime slurry and filtering the solution to obtain gypsum residue and filtrate containing $Ca(DPA)_2$ for recycling in step (iii),
 (x) repeating step (iii) with the $Ca(DPA)_2$ generated in step (ix) and repeating the filtration process of step (iv),
 (xi) re-using the aqueous solution containing KCl and HCl generated in steps (vi) and (vii) for the decomposition of the residue obtained from step (x) as per the procedure of step (v), so as to consume residual acid and simultaneously building up KCl concentration,
 (xii) re-using the aqueous solution containing $KNO_3$ and $HNO_3$ generated in step (viii) for the complete decomposition reaction of the remaining residue of step (xi) as per the procedure of step (viii), so as to consume residual acid and simultaneously building up $KNO_3$ concentration, (xiii) building up the KCl and $KNO_3$ concentrations in the solutions towards saturation limits by taking the solutions of salt and acid through several cycles as described in steps (xi) and (xii), respectively, (xiv) treating the near-saturated KCl solution obtained in step (xiii) with 1-5% by weight of KCl of schoenite to precipitate out traces of $Ca^{2+}$ impurity in the solution in the form of gypsum by utilizing the sulphate in schoenite, (xv) treating the above said KCl solution of step (xiv) with stoichiometric amount of schoenite generated in step (ii) to obtain SOP, (xvi) filtering the above said solution of step (xv) to obtain the desired SOP having >92% purity and the mother liquor (KEL) and (xvii) recycling the mother liquor (KEL) obtained in step (xvi) in step (i) for subsequent batches of reactions.

2. A process as claimed in claim 1 wherein the kainite type mixed salt used contains KCl-15-22%; NaCl-15-22%; $MgSO_4$-28-40%; $MgCl_2$-5-10%.

3. A process as claimed in claim 1, wherein in step (i) one part by weight of mixed salt is treated with 0.3-0.7 parts by volume of water in a first batch reaction.

4. A process as claimed in claim 1, wherein in step (i) one part by weight of mixed salt is treated with 0.75-1.25 parts by volume of KEL obtained in step (xvi) in the subsequent batches of reactions.

5. A process as claimed in claim 1, wherein the composition of KEL obtained in step (xvi) is typically 11-14% KCl, 1-3% NaCl, 9-11% $MgSO_4$, and 1-2% $MgCl_2$.

6. A process as claimed in claim 1, wherein the composition of SEL obtained in step (ii) is typically 6-12% KCl, 5-15% NaCl, 10-20% $MgSO_4$ and 4-10% $MgCl_2$.

7. A process as claimed in claim 1 wherein the composition of the schoenite obtained in step (ii) is 40-45% $K_2SO_4$, 30-35% $MgSO_4$ and 0.5-2.0% NaCl.

8. A process as claimed in claim 1, wherein all processing was carried out under ambient conditions.

9. A process as claimed in claim 1, wherein the $Ca(DPA)_2$ used is prepared by treating DPA with 1-5% stoichiometric excess of lime slurry.

10. A process as claimed in claim 9, wherein the mole ratio of DPA to lime for the preparation of $Ca(DPA)_2$ used is 1:0.5 to 1:0.6.

11. A process as claimed in claim 1 wherein in step (iii) 1 mole of $Ca(DPA)_2$ used is treated with SEL containing 2.0-2.5 mol of KCl.

12. A process as claimed in claim 1, wherein the molar yield of K(DPA) obtained is 95-99% with respect to $Ca(DPA)_2$.

13. A process as claimed in claim 1, wherein the strength of HCl used for decomposition of K(DPA) is 5-6 N.

14. A process claimed in claim 1, wherein the KCl solution obtained has a concentration of 2-25%.

15. A process as claimed in claim 1, wherein the treatment of the aqueous KCl with schoenite improved the purity of KCl from 85-90% to 92-96%.

16. A process as claimed in claim 1, wherein the molar yield of KCl obtained is in the range of 83-90% with respect to K(DPA).

17. A process as claimed in claim 1, wherein the strength of aqueous $HNO_3$ used for the decomposition of residual K(DPA) IS 4-6 N.

18. A process as claimed in claim 1, wherein the loss of DPA obtained per cycle is less than 1%.

19. A process as claimed in claim 1, wherein one part by weight of schoenite used is treated with 0.3-0.5 parts by weight of KCl in the form of a concentrated solution.

20. A process as claimed in claim 1, wherein the SOP obtained has $K_2O$ content in the range of 45-50%.

21. A process as claimed in claim 1, wherein the molar yield of SOP obtained is in the range of 55-65% with respect to total $K_2O$ in schoenite and KCl and the balance is recycled for the decomposition of kainite mixed salt.

22. A process as claimed in claim 1, wherein the molar yield of SOP obtained is in the range of 89-92% with respect to the $K_2O$ content in kainite mixed salt.

23. The process as claimed in claim 1, wherein all processing was carried out at a temperature in the range of 15 to 40° C.

24. The process as claimed in claim 1, wherein in step (iii) 1 mole of $Ca(DPA)_2$ used is treated with SEL containing 2.0-2.5 mol of KCl.

25. The process as claimed in claim 1, wherein the KCl solution has a concentration of 2-25%.

* * * * *